United States Patent
Hoer

[15] 3,662,672

[45] May 16, 1972

[54] PROTEIN FIBER FORMING

[72] Inventor: Ralph A. Hoer, Ballwin, Mo.

[73] Assignee: Ralston Purina Company, St. Louis, Mo.

[22] Filed: May 19, 1969

[21] Appl. No.: 825,979

[52] U.S. Cl............................................99/17, 99/14, 99/20
[51] Int. Cl. .............................................................A23l 1/20
[58] Field of Search .....................99/14, 17, 18; 260/112, 20

[56] References Cited

UNITED STATES PATENTS

| | | | |
|---|---|---|---|
| 3,047,395 | 7/1962 | Rusoff | 99/14 |
| 3,127,388 | 3/1964 | Johnson et al. | 260/123.5 |
| 3,488,770 | 1/1970 | Atkinson | 99/17 |

*Primary Examiner*—Raymond N. Jones
*Assistant Examiner*—Roger B. Andewelt
*Attorney*—Robert W. Brukardt and Edward H. Renner

[57] ABSTRACT

A process of continuously forming tender textured protein structures is disclosed. The structures are formed from an aqueous slurry of a proteinaceous material having a solids content of up to about 35 percent by weight. The proteinaceous solids should be of a fairly high purity. The proteinaceous slurry is formed into textured filaments or fibers by continuously heating the slurry under pressure and cooling the slurry. The texture of the protein structures can be readily controlled by the process conditions, starting material, or reagents used in the process.

7 Claims, No Drawings

PROTEIN FIBER FORMING

Food scientists have been interested for some time in providing textured, fibrous protein products which can be produced from non-textured edible protein sources. The shortage of protein for human consumption is the most pressing food problem of our time. The problem is compounded by the difficulty in providing palatable protein foods from the available sources of protein. Many protein sources such as animal protein concentrates and by-products, cereal proteins, oilseed protein and microbial protein have not been fully utilized for human food because they are not in a form which is acceptable to humans. Humans prefer the mouth-feel of meat, which has definite texture and a fibrous quality. Most animal protein concentrates and by-products, cereal proteins, protein concentrates and microbial protein concentrates are in a paste or an amorphous powdered form. To make animal protein, oilseed protein and microbial protein useful it is desirable to process them to give them a textured or fibrous quality which is appealing to humans.

Food scientists have resorted to a variety of techniques to produce a structured protein. The most common and successful technique has been the wet spinning process such as that disclosed in the U.S. Pat. No. 2,730,447 to R. A. Boyer. The wet spinning process produces fibers by extruding a plurality of fine streams of an aqueous solution of protein into a chemical coagulating bath. The protein coagulates into fine fibers which are collected together and treated to form an edible textured protein. Other methods of forming textured protein are extrusion of proteinaceous material as disclosed by U.S. Pat. No. 3,142,571 to J. K. McAnelly and heat coagulation of undenatured protein as disclosed by U.S. Pat. No. 3,047,395 to I. I. Rusoff et al.

The above methods of producing textured protein individually or collectively have a number of drawbacks, including difficulty of use in commercial practice, requirement of special equipment necessitating a large capital expenditure to commercialize, and requirement of a number of operative steps and a large amount of reagent chemicals in proportion to the amount of fibered protein produced. A particular problem faced by current methods of producing textured or fibered protein is the difficulty in producing a bland product, particularly when an oilseed protein is used as the starting material. Oilseeds, such as soybean, contain compounds which produce flatulence and an "off" or "beany" flavor in products which are made from the oilseed protein. To remove the flatulence causing compounds and "off" or "beany" flavors from extruded protein fibers, for example, it is necessary to subject the fibers to a series of washing steps to remove the objectionable compounds. The washing steps make the process of producing fibered protein more complex and expensive.

The process of this invention produces a tender, bland fiber which can be directly incorporated into simulated meat or other products to provide a pleasing taste and mouth-feel and to form a food product which is acceptable for human consumption. The process can be carried out on simple, readily available equipment and does not require a large amount of reagent chemicals. The process is inexpensive and simple to operate.

The invention involves heating a slurry of proteinaceous material by conducting the slurry through a heat exchanger under high pressure. The slurry can have a solids content of about 0.3 to 35 percent or more by weight, depending on the limitations of the pump; the solids should be protein at a fairly high purity. After the proteinaceous slurry passes through the heat exchanger, it may be cooled and pumped into a collecting zone. The textured protein is recovered from the collecting zone.

A variety of proteinaceous materials can be used to produce fibers by the process of this invention; vegetable protein such as soy or other oilseed protein concentrates, e.g., high purity soy isolates and soy meals or flakes; animal protein concentrates, such as albumen and casein; and microbial protein, from sources such as brewer's yeast, torula yeast, or petro protein can be used in the process of the invention. It is important that the protein used be of fairly high purity, however. Preferably, the proteinaceous material should be above about 70 percent pure protein.

The exact reaction which produces the fibers is not known. However, it is believed that the protein reacts under the temperature and pressure conditions of the process to produce elongated multi-molecular protein polymers. For the process to produce the reacted protein in the elongated filaments which are most desirable, the protein starting material should be in a sufficiently reactive form. The proteinaceous material should be in a hydrated or soluble state to be reactive. If the native protein is not in a reactive form, it may be hydrated or made more soluble in several ways: by finely grinding an aqueous slurry of the protein; by subjecting an aqueous slurry of the protein to a change in pH, either by raising the pH to a point well above the isoelectric point or by lowering the pH to a point below the isoelectric point; or by a combination of finely grinding and pH change treatment. Care must be used in adjusting the pH so that the material is not hydrolyzed to a point that it will not react when processed by the method of the invention. A high pH between about 8 and 12 has proven to be satisfactory. After the proteinaceous material has been treated to make it sufficiently reactive, the pH of the slurry can be readjusted to the isoelectric point range, for example, between about 4 and 6 for soy protein, and the slurry reacted by the described process.

If the proper reagent materials are used, the protein filaments can be produced over a much broader pH range. The salts and hydroxides of certain polyvalent metals act as linking agents which permit the reaction to be carried out to form protein filaments from a slurry having a pH range of about 4 to 11. Calcium hydroxide, calcium chloride, aluminum sulfate and other salts and hydroxides of bivalent and trivalent metals such as magnesium and copper have proven to be suitable linking agents. It is believed that the polyvalent metal ions promote or participate in the reaction which forms the protein structures.

The reaction takes place as a function of time, temperature and pressure. Generally, temperatures as low as 165 °F. may be satisfactory to produce the structured material, depending on the protein used. Temperatures of between about 240° and 315 °F. are preferred, especially for soy protein or egg albumen. The protein will degrade if heated at too high a temperature for too long. After the protein material is heated it may be subjected to a cooling step, generally cooling will be to a temperature of 160° to 210 °F., depending on the protein material used.

The process may be operated over a wide pressure range; pressures above about 50 psig are satisfactory to produce the desired texture. Preferably, back pressures of between 50 and 5,000 psig are used. A restrictive orifice may be placed in the exit line from the process equipment. The orifice serves to help maintain a back pressure on the system and to control the shape of the product. In general, circular orifices between 0.015 and 0.030 inch in diameter have proven to be satisfactory. Rectangular orifices have also proven to be satisfactory for some applications. A rectangular orifice 0.375 × 0.0625 inch has been used to produce flattened filaments.

The method of producing edible protein structures will be more apparent from the following examples which are chosen from the many specific combinations which are possible to illustrate the invention and are not to be construed as limiting the scope of the invention.

EXAMPLE 1

A dried soy protein isolate obtained from the Ralston Purina Company under the trade name of Edi-Pro-A was slurried with water, the pH was adjusted to about 10 with NaOH solution, and the protein was precipitated by reducing the pH of the slurry to 4.5 with 85% $H_3PO_4$ solution. The hydrated protein was separated and reslurried with water at a solids content of 25 percent by weight. The protein purity of the solids was about 95 percent. The pH of the slurry was then increased to 5.0 by adding 50% NaOH solution. The slurry was pumped at a pressure of 5,000 psig through a four coil heat exchanger made of 80 ft. of ⅜ inch × 0.209 inch I. D. seamless stainless steel tubing in a 6 inch pipe. The temperature of the heat exchanger was set at 300° F. The retention time in the heat exchanger at this pressure was about 5 minutes. The slurry passed through the heat exchanger, was expelled through a 0.0135 inch diameter circular nozzle, and was cooled by dropping 20 feet through ambient air to a collecting vessel. The fibers were recovered and the excess water was removed by centrifuging. The fibers were light and tender, were about 40 to 60 mm. in length, about one-sixty-fourth inch in diameter and had a moisture content of 55 to 60 percent by weight. The recovered fibers could be combined with other materials to produce a high grade meat extender. To make a quality meat extender 48 parts by weight of recovered fibers were mixed with 48 parts by weight water and 4 parts by weight of combined salt, albumen, whey and a tracer. The meat extender could be used to make up as much as 50 percent by weight of hamburger patties when combined with lean muscle meat. The extended patties had good meat-like flavor and texture. The meat extender has the additional advantage of retaining the moisture and fat upon frying which prevents shrinkage and improves the nutritional value of the meat.

EXAMPLE 2

A slurry prepared as described in Example 1 was found to have a pH of 4.5. The slurry was treated at pH 4.5 by the process of Example 1 and the fibers produced were recovered and centrifuged to remove excess water. The fibers were light and tender and were 15 to 30 mm. in length. They had a moisture content of 55 to 60 percent by weight and could be used as a bland meat extender as disclosed in Example 1.

EXAMPLE 3

A slurry prepared as described in Example 1 was adjusted to pH 5.5 by adding 50% NaOH solution. The slurry was treated by the process of Example 1 and fibers similar to those of Example 1 were recovered.

EXAMPLE 4

A slurry prepared as described in Example 1 was adjusted to pH 5.0 by adding $Ca(OH)_2$. The slurry was treated by the process of Example 1 and fibers similar to those of Example 1 were recovered.

EXAMPLE 5

A slurry prepared as described in Example 1 was adjusted to a pH of 6.0 by adding $Ca(OH)_2$. The slurry was treated by the process of Example 1 and fibers similar to those of Example 1 were recovered.

EXAMPLE 6

A slurry prepared as described in Example 1 was adjusted to pH 11 by adding $Ca(OH)_2$. The pH was then lowered to 6.0 by adding 85% $H_3PO_4$ solution and the slurry was treated by the process of Example 1. Fibers similar to those of Example 1 were recovered, except they were lighter in color.

EXAMPLE 7

A slurry prepared as described in Example 1 was adjusted to a pH of 7.0 by adding $Ca(OH)_2$. The slurry was treated by the process of Example 1 and fibers similar to those of Example 1 were recovered. The fibers were used to produce a good grade bacon chip product. A batter consisting of 47 percent by weight recovered fibers, 10 percent protein flour, 13 percent water, 6 percent fat, 17 bacon flavor and 7 food dye was blended in a Hobart mixer until a smooth batter was obtained. The batter was then placed in a baking pan and cooked at 325° F. for 2 hours to obtain a tender but firm loaf. The loaf was sliced to form shreds resembling crisp, crumbled bacon in appearance, taste and texture. The shreds could be use as a bacon-like additive in soups, salads and cream dips.

EXAMPLE 8

A slurry prepared as described in Example 1 was adjusted to a pH of 8.0 by adding $Ca(OH)_2$. The slurry was treated by the process of Example 1 and fibers similar to those of Example 1 were recovered.

EXAMPLE 9

A slurry prepared as described in Example 1 was adjusted to a pH of 10 by adding $Ca(OH)_2$. The slurry was treated by the process of Example 1 and dark, tender fibers were obtained having a length of 20 to 30 mm. and a moisture content of 55 to 60 percent by weight.

EXAMPLE 10

The slurry of Example 2 was treated by the process of Example 1 with the heat exchanger temperature set at 240° F. and the pump pressure at 3,000 psig. Fibers similar to those of Example 2 were recovered.

EXAMPLE 11

The slurry of Example 2 was diluted with water to a solids content of 0.5 percent by weight and was treated by the process of Example 1 with the heat exchanger temperature set at 310° F. and the pump pressure set at 500 psig. The retention time at this temperature and pressure was about 5 minutes. Longer fibers similar to those of Example 2 were recovered.

EXAMPLE 12

A slurry prepared as described in Example 1 was diluted to a solids content of percent by weight. The pH was adjusted to 10 by adding $Ca(OH)_2$; the material was treated by the process of Example 1 with the heat exchanger temperature set at 310° F. and the pump pressure set at 5,000 psig. Dark fibers similar to those of Example 9 were recovered.

EXAMPLE 13

Soybean isolate obtained from Ralston Purina Company under the trade name Edi-Pro-A was slurried as described in Example 1, was precipitated, and was reslurried at a solids content of 21 percent by weight. The protein purity of the solids was about 95 percent. The pH of the slurry was adjusted to 4.8 by adding 50% NaOH solution. The slurry was pumped through the four coil heat exchanger of Example 1 at a pump pressure of 1,000 psig. The temperature of the heat exchanger was set at 290° F. After the slurry passed through the heat exchanger it was conducted through a cooler where it was cooled to 180° F. The cooled slurry was expelled through a 0.375 by 0.0625 inch slot type nozzle. A continuous filament or ribbon was expelled from the nozzle. The ribbon was light, tender and bland. When chopped into short lengths it had textural properties similar to good grade ground meat, such as pork sausage or hamburger.

EXAMPLE 14

A slurry prepared as described in Example 13 was treated by the process of Example 13. The temperature at the heat exchanger was set at 290° F. and the heated slurry was cooled to 250° F. at the cooler. The material was further cooled by expelling it through the nozzle of Example 13 which was immersed in a bath of cool water. A ribbon similar to that of Example 13 was recovered.

EXAMPLE 15

Soy isolate prepared as described in Example 13 was reslurried at a solids content of 20 percent by weight. The pH of the slurry was adjusted to 9.0 by adding Ca(OH)$_2$. The slurry was treated by the system of Example 1 at a pump pressure of 500 psig and a heat exchanger temperature of 300 ° F. Long, dark, tender fibers were recovered from the processed slurry.

EXAMPLE 16

A slurry prepared as described in Example 15 was treated by the process of Example 15 at a pump pressure of 5,000 psig. Fine protein fibers were recovered from the processed slurry.

EXAMPLE 17

A slurry prepared as described in Example 15 was adjusted to pH 5.0 by adding 50% NaOH solution. The slurry was treated by the process of Example 15 at a pump pressure of 5,000 psig and a heat exchanger temperature of 280 ° F. Long, tender fibers were recovered from the processed slurry.

EXAMPLE 18

A slurry prepared as described in Example 15 was adjusted to a pH of 5.0 by adding 50% NaOH solution. The slurry was treated by conducting it through one coil of the four coil heat exchanger of Example 1 at a heat exchanger temperature of 260 ° F. and a pump pressure of 700 psig. The retention time at this temperature and pressure was about 1 minute. The fibers were recovered by the method described in Example 1. Short, smooth fibers were recovered.

EXAMPLE 19

A slurry prepared as described in Example 15 was adjusted to a pH of 5.0 by adding 50% NaOH solution. The slurry was pumped through a direct steam injection heat exchanger where steam was injected directly into the slurry to raise the temperature of the slurry to 305 ° F. The retention time in the heat exchanger was about 4 seconds. The heated slurry was expelled through a circular nozzle having a 0.0292 inch diameter and was cooled by falling about 2 feet through ambient air to a collection zone. A back pressure of 60 psig was maintained on the system. Very fine light, bland fibers were recovered from the treated slurry.

EXAMPLE 20

A good grade bacon chip product was obtained directly from the process of Example 13. To the slurry of Example 13 4½ bacon flavor and 1 percent food dye was added. The pH was adjusted to a pH of 4.8 by adding 50% NaOH solution and the slurry was treated as described in Example 13. The recovered filament or ribbon was shredded and dried. The dried product had a flavor, appearance and texture resembling crisp, crumbled bacon and could be used as a bacon-like additive in soups, salads and cream dips.

EXAMPLE 21

Hydrochloric acid precipitated casein was reprocessed by slurrying with water, increasing the pH to 8.0 with 50% NaOH solution and precipitating the casein by lowering the pH to 4.5 with 85% H$_3$PO$_4$ solution. The precipitated casein was collected and reslurried with water at a solids content of 18.7 percent by weight. The solids content consisted of protein of about 95 percent purity. The slurry was pumped through the four coil heat exchanger of Example 1 at a pump pressure of 200 to 400 psig. The temperature of the heat exchanger was set at 220 ° F. The slurry was conducted through an ⅛ inch orifice into an ambient water bath to collect the fibers and to prevent them from sticking together. Light, tender fibers were recovered.

EXAMPLE 22

Hydrochloric acid precipitated casein was treated as described in Example 21 and reslurried with water at a solids content of 5 percent by weight. The slurry was pumped through the four coil heat exchanger of Example 1 at a pump pressure of 400 to 1,000 psig. The temperature of the heat exchanger was set at 190 ° F. The slurry was then cooled to 160 ° F. by conducting it through a cooler. The cooled slurry was expelled through a 0.375 by 0.0625 inch slot type nozzle. A continuous ribbon or filament was expelled from the nozzle. The ribbon was light, tender and bland.

EXAMPLE 23

Hydrochloric acid precipitated casein was slurried with water at a solids content of 20 percent by weight. The slurry was ground through a Fitz mill twice for maximum rehydration. The slurry pH was 4.4. The slurry was pumped through the four coil heat exchanger of Example 1 at a pump pressure of 2,000 to 3,000 psig. The temperature of the heat exchanger was 170 ° F. The heated slurry was pumped through a 0.028 inch diameter nozzle and was cooled by dropping 20 feet through ambient air to a collecting screen. Light, tender fibers were recovered from the screen. The fibers tended to fuse together to form a fibrous mat structure.

EXAMPLE 24

Egg albumen of about 92 percent protein purity and a solids concentration of 11 percent by weight was adjusted to pH 4.65 by adding 85% H$_3$PO$_4$ solution. The slurry was treated by the process described in Example 23 at a pump pressure of 1,000 to 1,500 psig and a heat exchanger temperature of 295 ° F. Light, tender fibers approximately 2 inches in length were recovered.

EXAMPLE 25

Twenty-five pounds of turkey meat (24 percent solids, 80 percent protein purity), 25 pounds of isolated soy curd (27.4 percent solids, 95 percent protein purity), and 20 pounds of water were blended and ground in a Colloid mill. The mixture was homogenized in a Manton-Gaulin pump. The pH of the slurry was 5.1. The slurry was pumped through the heat exchanger described in Example 1 at a pump pressure of 800 to 900 psig and a heat exchanger temperature of 315 ° F. The treated slurry was conducted through a cooler maintained at 185° to 200 ° F. and expelled through a 1/16 inch × ½ inch orifice into a collecting zone. Short, tender fibers were recovered.

EXAMPLE 26

An imitation coconut shred was produced by the process described in Example 1. A slurry prepared as described in Example 1 had 2 percent vegetable oil (Durkex) and 0.5 percent coconut flavor added. The flavored slurry was processed as described in Example 1 at a pump pressure of 3,000 psig. Small fibers were recovered which resembled shredded coconut and had a strong coconut flavor.

I claim:

1. A method of continuously forming elongated tender protein filaments from proteinaceous material comprising:
    a. forming a slurry of high purity proteinaceous material with water, the slurry having a proteinaceous solids content of between about 0.3 and 35 percent by weight,
    b. treating the slurry to place the proteinaceous material in a sufficiently reactive form to produce elongated protein filaments by raising the pH of the slurry to well above the isoelectric point of the slurry and then lowering the slurry pH to between about 4 and 6,
    c. continuously conducting the treated proteinaceous slurry under pressure suitable to produce elongated tender protein filaments through a heat exchange zone and heating the slurry to a temperature between about 240° and 315° F. for a period of time sufficient to produce elongated tender protein filaments in the slurry, continuously removing the heated slurry and elongated protein fibers through an orifice to a collecting zone, and d. recovering tender elongated protein filaments from the slurry.

2. The process of claim 1 wherein the proteinaceous material is selected from the group consisting of soy protein, albumen and casein.

3. The method of claim 1 wherein the slurry is processed at a pressure between about 50 and 5,000 psig.

4. The process of claim 1 wherein the slurry is heated with an injection heat exchanger.

5. The product produced by the process of claim 1.

6. A process of continuously forming elongated tender protein filaments from proteinaceous material comprising:
 a. forming a slurry of high purity proteinaceous material with water, the slurry having a proteinaceous solids content of between about 0.3 and 35 percent by weight,
 b. adjusting the pH of the slurry to place the proteinaceous material in a sufficiently reactive form to produce elongated protein filaments to between about 4 and 11 with hydroxides and salts of polyvalent linking agents selected from the group consisting of calcium, aluminum, magnesium,
 c. continuously conducting the treated proteinaceous slurry under pressure suitable to produce elongated tender protein filaments through a heat exchange zone to heat the slurry to a temperature between about 240° and 315° F. for a period of time sufficient to produce elongated tender protein filaments in the slurry and continuously removing the heated slurry and elongated protein fibers through an orifice to a collecting zone, and
 d. recovering tender elongated protein filaments from the protein slurry.

7. The product produced by the process of claim 6.

* * * * *

UNITED STATES PATENT OFFICE
CERTIFICATE OF CORRECTION

Patent No. 3,662,672   Dated May 16, 1972

Inventor(s) Ralph A. Hoer

It is certified that error appears in the above-identified patent and that said Letters Patent are hereby corrected as shown below:

Column 1, line 15 - "oilseed" should be inserted before "protein" (first occurrence).

Column 2, line 43 - "and" should be substituted by "to".

Column 3, line 72 (Example 7) - "percent" should be added after "17" and "7".

Column 4, line 38 (Example 12) - "10" should be inserted before "percent".

Signed and sealed this 6th day of August 1974.

(SEAL)
Attest:

McCOY M. GIBSON, JR.
Attesting Officer

C. MARSHALL DANN
Commissioner of Patents